United States Patent [19]

Mentschel

[11] 3,758,085
[45] Sept. 11, 1973

[54] CENTRIFUGAL DEVICE FOR TREATING GASES OR VAPORS WITH LIQUIDS

[75] Inventor: Hellmuth Mentschel, Erlangen, Germany

[73] Assignee: Siemens Aktiengesellschaft, Berlin and Munich, Germany

[22] Filed: June 15, 1971

[21] Appl. No.: 153,208

[30] Foreign Application Priority Data
June 18, 1970 Germany.................. P 20 29 994.9

[52] U.S. Cl................... 261/89, 55/230, 55/238, 55/403
[51] Int. Cl............................................ B01d 47/16
[58] Field of Search................... 261/84, 88–90; 55/230–231, 235, 237, 238, 400–409

[56] References Cited
UNITED STATES PATENTS

| | | | |
|---|---|---|---|
| 2,046,895 | 7/1936 | Delamere | 261/89 |
| 2,593,763 | 4/1952 | Kapitza | 261/89 |
| 2,601,519 | 6/1952 | Hardy et al. | 261/90 X |
| 2,941,872 | 6/1960 | Pilo et al. | 261/84 X |
| 3,406,498 | 10/1968 | Wisting | 261/89 X |
| 3,474,597 | 10/1969 | Eckert | 261/84 X |
| 3,538,657 | 11/1970 | Macrow | 261/89 X |
| 3,544,084 | 12/1970 | Macrow | 261/90 X |

*Primary Examiner*—Frank W. Lutter
*Assistant Examiner*—Vincent Gifford
*Attorney*—Curt M. Avery, Herbert L. Lerner et al.

[57] ABSTRACT

A centrifugating device for reacting gases or vapors with liquids or with liquid or solid substances finely distributed in liquids, comprises a centrically arranged rotor shaft to which rotor wheels are attached which carry centrifugating or fling members with reaction stages being formed by fixed partitions between the rotor wheels. The centrifugating members at least, in part, are made in the form of bristles, and baffles are located on the rotor wheels. The fling and baffle members serve to destroy and re-form the liquid surface.

11 Claims, 5 Drawing Figures

CENTRIFUGAL DEVICE FOR TREATING GASES OR VAPORS WITH LIQUIDS

My invention concerns a device for treating gases or vapors with liquids or with liquid or solid substances finely distributed in liquids.

Gases and vapors are treated with liquids, solutions or suspensions in most cases for the purpose of purifying gases by means of liquids, at least one constituent of the gas being absorbed in the liquid or made to react with it. This is often done by moving the gas in an opposite direction to the flow of the liquid into intimate contact with the liquid in columns. For this purpose, apparatus is used which has a rotor, in which the gas is brought into intimate contact with the liquid. These devices are designed so that large contact surfaces are provided and contact between the gas and the liquid is possible over an extended period of time. In the British Pat. No. 1,026,291, for example, the liquid is atomized and subjected, together with the gas, to circulation perpendicular to the direction of rotation of the rotor.

If a gas is brought into contact with a liquid, absorption or a chemical reaction takes place as a boundary-surface reaction. In most cases, this takes place relatively rapidly, but only in a thin outer layer of the surface of the liquid. The diffusion processes thereafter, however, which transport the absorbed gas or the reaction products into the interior of the liquid take place much more slowly. The enrichment with absorbed gas or reaction products in the boundary layer between the liquid and the gas therefore leads rapidly to a saturation of this contact surface and therefore to a kind of barrier layer. The large absorption rate at the beginning of the reaction is therefore reduced rapidly. In the known device, the relatively slow diffusion processes within the liquid determine largely the rate at which the gas is absorbed and/or reacted.

It is an object of my invention to carry out the reaction of gases or vapors with liquids, solutions, suspensions or the like in such a manner that the diffusion rate has no appreciable influence on the absorption process.

Another object of my invention is to provide apparatus in which the purification of the gas with liquids is improved as compared with prior art apparatus.

Still another object of my invention is to provide such apparatus in which the power required to operate the apparatus is kept to a minimum.

Another object of my invention is to utilize the gas being purified in driving the centrifugal device.

Other objects, advantages and features of the present invention will become more apparent from the following description.

To this end, and according to may invention, I provide a device for reacting gases or vapors with liquids or with liquid or solid substances finely distributed in liquids, comprising a centrically arranged rotor shaft to which rotor wheels are attached which carry centrifugating members, reaction stages being formed by fixed partitions between the rotor wheels. The centrifugating members (hereafter also called "fling members") are at least, in part, made in the form of bristles, and baffles are furthermore located on the rotor wheels. The fling and baffle members serve to destroy and re-form the liquid surface.

In this device, which in the following will be called a reaction centrifuge, the liquid is separated from the fling member by the centrifugal force and thrown onto the baffle. Thereby, the existing liquid surface formed by the separation from the fling member is continuously destroyed and a new surface generated. On the way from the fling to the baffle member the liquid droplets come in contact with the gas, the reaction, for instance, absorption or a chemical reaction, taking place at the boundary surface between the liquid and the gas. Immediately thereafter, upon impact with the baffle, the surface of the liquid droplet which would act as a barrier layer due to the charge with gas or reaction produces, is destroyed and a renewed reaction of the gas with the liquid is made possible through the regeneration of the liquid surface. Thereby the reaction between the gas and the liquid is not influenced by diffusion processes.

The invention will be further described with reference to the embodiments thereof, illustrated by way of example on the accompanying drawings in which.

Figure 1:
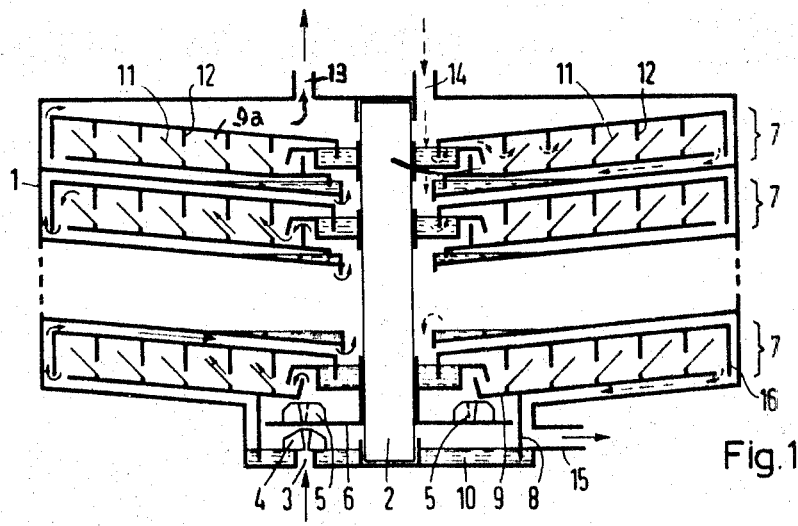
FIG. 1 is a cross-sectional view of an embodiment of the centrifugal device for treating gases with liquids according to the invention.

Referring to the drawings, and in particular to FIG. 1, the coaxial reaction centrifuge is shown with a housing 1 and a rotor shaft 2. The rotor can be driven by a motor (not shown). However, the gas itself which is reacting with the liquid can also be advantageously used to drive the rotor. For that purpose, a turbo drive is provided adjacent to an inlet opening 3, through which the compressed gas is fed to the reaction centrifuge. The turbo drive includes at least one nozzle 4 located at the opening 3 which directs the gas jet against guide vanes 5 which are mounted on a flange 6 attached to the rotor shaft 2. If a gas mixture reacts with a liquid in such a manner that not all components are absorbed by the liquid, it is advisable to react the compressed gas mixture with the liquid first in order to carry out this process at the highest possible pressure. Only the residual gas, which is under less pressure due to friction losses, is then used to drive the reaction centrifuge.

The path of the gas in the reaction centrifuge is indicated by solid lines. After leaving the drive arrangement, it enters the first of the reaction stages 7 at the rotor shaft. The path to the wall of the housing is blocked to the gas by a cylindrical partition 8, which is attached at a bottom surface 9 of a rotor wheel 16 of the lowest reaction stage 7 and is immersed in the liquid which is situated in the lower part of the reaction centrifuge, which is designed as a liquid reservoir 10. In the individual reaction stages 7, the gas passes by fling members 11 and baffle members 12 in the same direction as the liquid. However, from one reaction stage to another, the gas is conducted against the flow of the liquid. After leaving the last reaction stage the gas exits by an outlet opening 13. The liquid is fed into the reaction centrifuge through an inlet opening 14, moves through the individual reaction stages in the manner indicated by the dashed lines and is collected in the liquid reservoir 10 and leaves the reaction centrifuge by an outlet opening 15.

The rotor wheels 7 of the device according to FIG. 1 are advantageously provided with smooth top 9a and bottom 9 surfaces each where facing the wall of the housing 1, the partitions and the rotor shaft 2, and are only provided with the discharge and entrance openings, arranged parallel to the rotor shaft, for the liquid and the gas. In this case, the fling and baffle members arranged between the top and bottom surfaces of the rotor wheels form self-contained units, wherein due to the smooth design of the boundary surfaces, the pressure losses caused by friction with the gas are kept to a minimum. Due to the arrangement of the fling and baffle members in the rotor wheels designed in this manner, the friction losses between the gas, the liquid and the parts of the rotor wheels also can be kept to a minimum, as the destruction and regeneration of the liquid surfaces takes place inside the rotor wheels at approximately equal velocity of the rotating rotor wheel, the liquid and the gas. The reaction of the gas with the liquid, for instance, the absorption of carbon dioxide by aqueous solution of alkali compounds with basic reaction, can therefore be carried out in this manner because the charging speed of the liquid with the gas does not depend on the differential speed between the liquid and the gas, but on the frequency with which the contact surface is destroyed and regenerated.

As described above, the fling members of the device, according to the invention, are at least in part made in the form of bristles, which causes the separated liquid to be exclusively in the form of small droplets being carried from the fling members and in this manner, a large contact surface is provided. Stainless steel or plastics, such as polytrafluorethylene, polyvinylchloride, etc., can be used for the fling members.

Figure 2:
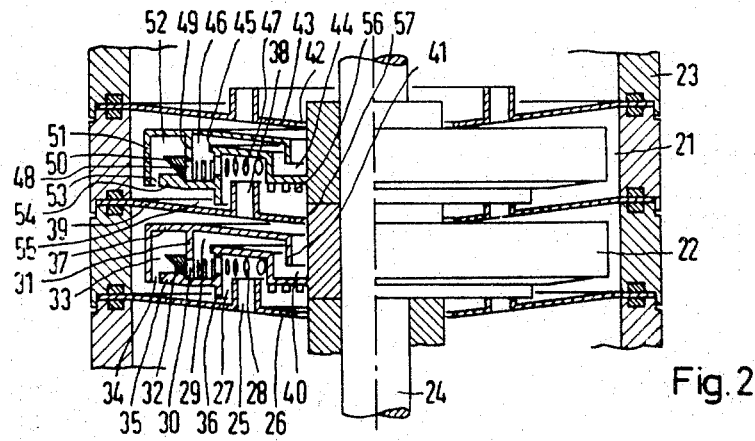
FIGS. 2 through 4 are cross-sectional views of additional embodiments of reaction stages used in the centrifugal device.

FIG. 2 shows two reaction stages 21 and two rotor wheels 22, respectively, of another embodiment of my invention including a wall 23 of the housing and a rotor shaft 24. Through openings 25 of a fixed partition 26, the gas enters a space 27 of the lower reaction stage which is situated below the rotor wheel. The gas passes through holes 28 of the rotor wheel into a space 29 in which it comes in contact with the liquid. Through openings 30 in a wall 31, which delineates this space and which can be designed as a baffle, the gas leaves the space 29, passes a fling member 32 and enters a space 33, in which it is brought into intimate contact with the liquid. The gas leaves the space 33 through a passage opening 34 in the bottom surface 35 of the rotor wheel. The path back into the space 27 underneath the bottom surface 35 is blocked by the liquid above the partition 26 and the cylindrical rib 36 of the rotor wheel, which is immersed in the liquid. The gas, therefore, takes the path via the top surface 37 of the rotor wheel and enters the next reaction stage through openings 38 in partition 39. The path back into the space 29 is blocked by the liquid, which is in a pan 40 and a wall 41 which extends into the liquid. In this reaction stage, and possibly in other reaction stages, this process is repeated until the gas finally leaves the reaction centrifuge after passing through the last reaction stage.

The liquid which is fed to the gas counterstream-wise enters the upper reaction stage through holes 42 in the partition 43. It is collected in a pan 44 and when the latter overflows the liquid moves into the space 46 at edge 45. Here, it comes in contact with the gas which flows out from holes 47 of the rotor wheel. The liquid is pushed through openings 48 of the wall 49, which can be designed as a baffle, by the centrifugal force and comes in contact with fling member 50. From the fling member 50, the liquid is thrown onto a partition 51. This partition, which is part of the top surface of the rotor wheel, is provided with an embossed mosaic pattern, at least partially on the inside and is therefore designed as a baffle member. In this manner, destruction and regeneration of the liquid surface takes place in space 52, as well as the intensive reaction of the gas with the liquid. The liquid leaves the space 52 thorugh passage openings 53 of the bottom surface 54 of the rotor wheel and drips on the partition 39. Due to the inclination of this fixed partition, the liquid runs off in the direction toward the rotor shaft and is collected in a space 55. If the latter is sufficiently full, the liquid leaves this space via overflow slots 56 and leaves the reaction stage through holes 57 of the partition 39. It subsequently drips to the pan 40 of the lower reaction stage. After passing through all the reaction stages, the liquid is discharged from the reaction centrifuge.

Figure 3:
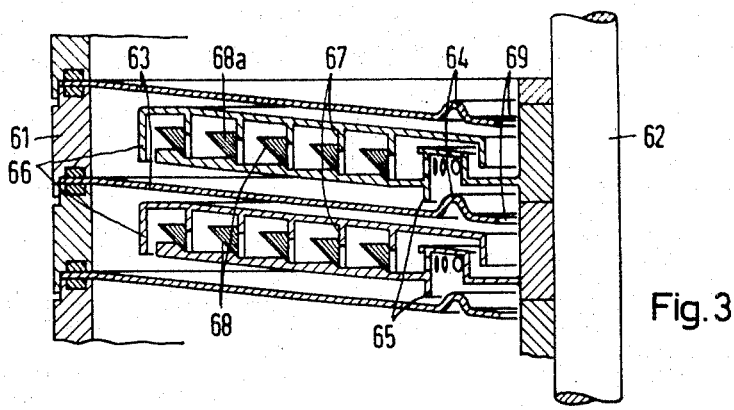

FIG. 3 shows two reaction stages of another embodiment of the device according to my invention, in which several groups are arranged in each reaction stage, each consisting of a fling member and a baffle member. The number of the groups of fling and baffle members can be chosen in accordance with the operating conditions. The gas and the liquids are fed in in this design, in the individual reaction stages, over an extended path in the same direction, and counterstream-wise only between the individual reaction stages. More particularly, the wall of the housing is designated 61 and the rotor shaft 62. The fixed partitions 63, which again are inclined, are also crimped at 64, which is deep enough that the ribs 65 in the bottom surfaces 66 of the rotor wheels dip into the liquid that collects on the partitions. The baffles are designated 67 and the fling members 68. In one fling member 68a, a bristle-like structure is indicated, this structure being utilizable in all the embodiments of my invention.

The gas and the liquid take the same path within the reaction stage in this embodiment as was explained in connection with the embodiment of FIG. 2. The passage of the gas and the liquid from one reaction stage to another, however, takes place in the embodiment described here through the same respective holes 69 in the partitions 63. The cross-section of the holes 69 is here selected so that the rising gas does not prevent the liquid from running off.

Figure 4:
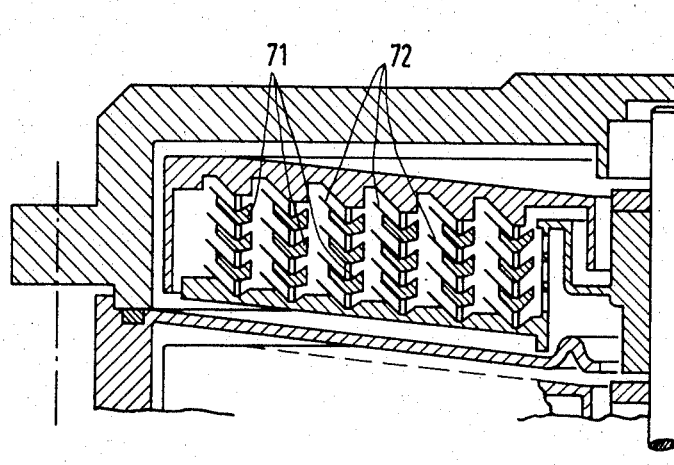

In FIG. 4, a reaction stage of a further embodiment of a reaction centrifuge is shown. In this embodiment, several groups consisting of one fling and baffle member each are arranged in each reaction stage in series and on top of each other. The baffle members are designated 71 and the fling members 72. This arrangement is advantageously chosen if operation with larger throughout rates of gas and liquid is involved, because due to the presence of many fling and baffle members in one reaction stage, the pressure losses which occur in the passing of the media is kept low.

Figure 5:
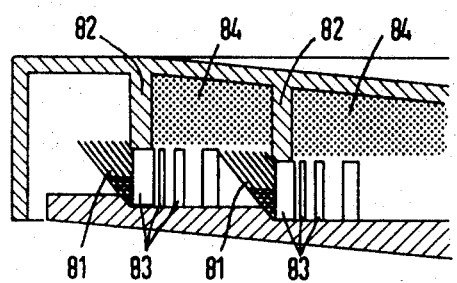
FIG. 5 is an enlarged sectional view of a rotor wheel used in the centrifugal device of my invention.

FIG. 5 shows an enlarged sectional view of a rotor wheel. In this embodiment, the fling members 81 consist of fine-mesh screens, the ends of which are slit open. The baffle members 82 in the interior of the rotor wheel are provided at their lower region with passage openings 83. The baffle members have an embossed mosaic pattern in their upper region, indicated by 84 in the Figure.

The baffles arranged inside the rotor wheels as shown in FIGS. 2 through 5 have passage openings for the gas and the liquid in their lower regions, which are connected with the bottom surface of the rotor wheel. While the gas passes through these openings unimpeded, the liquid comes in contact with the fling members attached at these points to the rotor wheel, climbs up on the former and is thrown off by the centrifugal force. As the baffle farthest from the rotor axis can preferably be used the outer end wall of the rotor wheel, which is part of the top surface, and this end wall is provided with an embossed mosaic pattern on the inside, at least partially, but has no passage opening for the gas and the liquid at its lower region.

The fling and baffle members arranged on the rotor wheels of the reaction centrifuge can advantageously be made of annular shape, and the entire available space is utilized for the reaction between the gas and the liquid. It is advisable to select the spacing between the baffle members and the fling members to that the droplets of liquid hit the baffle immediately after separation from the fling member. The perpendicular impact achieved thereby assures optimum destruction and regeneration of the contact surface.

The fling members of all the embodiments advantageously form an acute angle with the rotor shaft and, therefore, they are attached on the rotor wheels in such a manner that the part made of bristles points toward the adjacent baffle member of the same rotor wheel which is at a greater distance from the rotor axis. In this manner, the separating liquid is thrown completely onto the upper area of the baffles, which are not provided with openings.

The advantage obtained over prior art fling members which are parallel to the rotor axis is that no noticeable gas pressure loss occurs. The fine-mesh fabric of the fling members is coated during the operation with a film of liquid. If fling members are arranged vertically as boundary surfaces, a considerable pressure must be exerted to push the gas through them, while in the oblique arrangement of the fling members according to the invention, the gas passes unimpeded and no pressure loss occurs. This is of particular importance if the device serves to purify gases which are used for the operation of fuel cells. As the energy required for the operation of auxiliary power generators is to be supplied by the fuel cell itself, the efficiency of the latter decreases with every energy-consuming process. This is also the case if large pressure losses must be made up in the purification of the gases used.

The baffles of the reaction centrifuges illustrated above consist of walls which are advantageously arranged on the rotor wheels parallel to the rotor axis. It is advantageous that they furthermore include, at least partially, an embossed mosaic pattern. The impinging liquid droplets are thereby completely destroyed and through the regeneration of the surface of the liquid, a completely new contact surface is available for further reaction between the gas and the liquid.

If in such fuel cells, hydrogen is used as the fuel gas, the hydrogen required for this purpose is frequently made in a generator by reacting methanol and water vapor with oxygen. Here, however, a mixture is generated which contains approximately 75% by volume of hydrogen and 25% by volume of carbon dioxide. The carbon dioxide contained in the gas mixture must be removed if an alkaline electrolyte is used in the fuel cell. This is effectively done by removing the carbon dioxide by an alkazide solution, for instance, an aqueous solution of potassium alaninate; here the carbon dioxide is absorbed in the form of hydrogen carbonate. The absorption capacity of the alkazide solution for the carbon dioxide is strongly influenced by the described rapid formation of a barrier layer. The device according to the invention counteracts this process through the continuous destruction and regeneration of the liquid surface, and in this manner makes possible a fast reaction of the carbon dioxide with the alkazide solution. The device is also particularly well suited for this application because the gas mixture which is supplied by the generator under a certain pressure can be used in a gas turbine for driving the reaction centrifuge. Due to the design of the device, especially of the fling members, the baffles and the rotor wheels, the pressure loss within the reaction centrifuge is very small. Only the required acceleration of the liquid, i.e., the alkaline solution, from the condition at rest to a final velocity is the main energy-consuming process.

As described in FIG. 1, advantageously, the gas reacting with the liquid can be used, before or after the reaction, to drive the coaxial reaction centrifuge. This is achieved by making the pressurized gas serve as the drive medium for a turbo drive. The turbo drive and the rotor are advantageously mounted here on a common shaft in the same housing.

In addition to these preferred application possiblities the device according to the invention can find application for any other reactions of gases or vapors with liquids in which diffusion processes impede absorption or a chemical reaction. In this context, also solutions, suspensions or emulsions can be reacted with gases or vapors, i.e., solid or liquid substances dissolved or finely distributed in liquids.

It will thus be seen that the objects set forth above, among those made apparent from the preceding description, are efficiently attained and, since certain changes may be made in the above apparatus without departing from the scope of the invention, it is intended that all matter contained in the above description and shown in the accompanying drawings shall be interpreted as illustrative and not in a limiting sense.

I claim:

1. Centrifuge device for treating gases or vapors with liquids or with liquid or solid substances finely distributed in liquids, comprising a gas inlet and outlet, a liquid inlet and outlet, a centrically arranged rotor shaft, rotor wheels attached to said rotor shaft, said rotor wheels carrying centrifugating members disposed at an acute angle with respect to said rotor shaft, fixed partitions being disposed between said rotor wheels and forming reaction stages, said centrifugating members including bristles, and baffle members located on the rotor wheels spaced apart from said centrifugating members.

2. Centrifuge device according to claim 1, wherein each of said rotor wheels comprise one top surface and one bottom surface, said top and bottom surfaces being smooth in areas facing the exterior of the rotor wheel, and discharge and entrance openings for said liquid and gases being parallel to said rotor shaft, said centrifugating and baffle members being arranged between said top and bottom surfaces.

3. Centrifuge device according to claim 1, wherein said centrifugating members comprise fine-mesh screens, the ends of which are slit open.

4. Centrifuge device according to claim 1, wherein each of said centrifugating members is directed towards a respective baffle member disposed adjacently on the same rotor wheel at a larger distance from the rotor shaft than said centrifugating member.

5. Centrifuge device according to claim 1, wherein said baffle members located inside said rotor wheels comprise walls arranged parallel to the axis of the rotor, said walls being formed of an embossed mosaic pattern, and an opening in the lower region of said walls for passage of the gases and the liquid.

6. Centrifuge device according to claim 1, wherein said centrifugating members and said baffle members are of annular shape.

7. Centrifuge device according to claim 1, wherein at least one centrifugating member and one baffle member are located on each rotor wheel.

8. Centrifuge device according to claim 1, wherein groups comprising one centrifugating member and one baffle member each are arranged on the rotor wheel in each reaction stage in series.

9. Centrifuge device according to claim 1, wherein groups comprising one centrifugating member and one baffle member each are arranged on the rotor wheel in each reaction stage on top of each other.

10. Centrifuge device according to claim 1, wherein said gases are under pressure and drive the centrifugating device before or after reaction with said liquid.

11. Centrifuge device according to claim 1, wherein each of said rotor wheels comprise one top surface and one bottom surface, said top and bottom surfaces being smooth in areas facing the exterior of the rotor wheel, and discharge and entrance openings for said liquid being parallel to said rotor shaft, said centrifugating and baffle members being arranged between said top and bottom surfaces.

* * * * *